United States Patent
Underwood

[15] 3,692,742
[45] Sept. 19, 1972

[54] WATER RESISTANT POLYURETHANE/POLYMER LAMINATE

[72] Inventor: Theodore A. Underwood, Cuyahoga Falls, Ohio 44221

[73] Assignee: The Goodyear Tire & Rubber Company, Akron, Ohio

[22] Filed: Sept. 8, 1970

[21] Appl. No.: 70,464

Related U.S. Application Data

[63] Continuation-in-part of Ser. No. 408, Jan. 2, 1970.

[52] U.S. Cl. ..................220/63 A, 117/72, 117/77, 117/87, 117/96, 117/104 R, 117/138.8 D, 117/161 KP, 117/161 P, 117/161 UT, 117/161 UD, 117/161 ZB, 161/190, 260/75 TN

[51] Int. Cl. ............................................B65d 25/14

[58] Field of Search........117/77, 72, 95, 96, 161 KP, 117/161 P, 138.8 D, 138.8 E, 161 UT, 161 UD, 104 R, 161 ZB; 150/0.5; 161/190, 243, 255, 256; 220/63 A

[56] References Cited

UNITED STATES PATENTS

| | | |
|---|---|---|
| 2,558,807 | 7/1951 | Bailey.....................150/0.5 X |
| 3,382,138 | 5/1968 | Barth..........................161/190 |
| 3,429,948 | 2/1969 | Massoubre................260/859 |
| 3,492,393 | 1/1970 | Nourot et al. .............264/279 |
| 3,503,934 | 3/1970 | Chilvers......................260/75 |
| 3,509,016 | 4/1970 | Underwood et al. .......161/190 |

*Primary Examiner*—Edward G. Whitby
*Attorney*—F. W. Brunner and J. D. Wolfe

[57] ABSTRACT

A water resistant laminate comprising a cured ethylenic unsaturated polymer of an olefin containing from two to 20 carbon atoms and a polyurethane comprising a reaction product of 4,4'-dicyclohexyl methane diisocyanate, with an aromatic diamine and a polyester selected from the group consisting of polyhexamethylene adipate, polyhexamethylene azelate and polytetramethylene azelate and polytetramethylene adipate.

5 Claims, No Drawings

WATER RESISTANT POLYURETHANE/POLYMER LAMINATE

This application is a continuation-in-part of application, Ser. No. 408, Filed Jan. 2, 1970.

This invention relates to laminates and to a method of preparation thereof. More particularly, this invention relates to a laminate of polyurethane with an ethylenic unsaturated elastomer or polymers which can be cured by subjecting the laminate to contact with high pressure steam.

Although polyurethane elastomers have excellent properties in many respects, they have unusually poor resistance to hydrolysis. Likewise, the polymers and elastomers containing ethylenic unsaturation have excellent properties in some respects but do not generally offer the handling and shaping advantages associated with polyurethane. Consequently, it has been desirable to form polyurethane laminates with the ethylenic unsaturation polymers or elastomers to achieve the desired balance of properties and handling characteristics. Heretofore, the preparation of such laminates had presented appreciable problems due to the tendency of the ethylenic unsaturated polymers and elastomers to delaminate during the curing cycle.

Therefore, an object of this invention is to provide a method of preparing laminates to take advantage of the excellent properties of the polyurethane and the ethylenic unsaturated elastomers and polymers.

A further object of this invention is to provide a fuel cell or related container having a continuous or seamless inner layer covered with a layer of cured ethylenic unsaturated elastomer.

This object and other advantages of this invention may be achieved by forming a polyurethane in contact with an ethylenic unsaturated polymer or elastomer and curing the polymers in high pressure steam to obtain a laminate with a polyurethane whose physical properties have been enhanced during the curing operation. Lamina produced in this manner find many uses. For instance, in the conventional polyurethane liquid container, it is impossible to handle certain foods, liquids and water in these containers because the polyurethane containers are unable to be used since they do not pass the government regulations on health and other safety precautions. Therefore, a lamina containing a copolymer of butadiene styrene or butadiene acrylonitrile may be used as the inner layer in the polyurethane container to form a container satisfactory for handling various foods, water and related comestibles. Another use in which a lamina of polyurethane and an ethylenic unsaturated polymer or elastomer is desirable is in the self-sealing fuel tank where the ethylenic unsaturated polymer is natural rubber or other elastomers well-known to the self-sealing tank art which readily swell when brought in contact with gasoline and other related hydrocarbon solvents to close the puncture in the container.

This object can be achieved also by forming a reaction mixture of a polyester of the type hereinafter described with 4,4'-dicyclohexyl methane diisocyanate and specific organic diamines such as 4,4'-dianilino-methane where the amine level is in the range of approximately 0.75 to 1.0, and preferably 0.8 to 0.90 and forming the reaction mixture into a shaped reaction product, preferably in contact with an ethylenically unsaturated polymer and elastomer and then curing with high pressure steam. This reaction product can be prepared by the one-shot, prepolymer or the other well-known methods for making polyurethanes.

The polyesters useful in this invention are polytetramethylene adipates, polytetramethylene azelates, polyhexamethylene adipates and polyhexamethylene azelates having a molecular weight of 800 to 2,200 and preferably a mixture of these polyesters having a low molecular weight and one of a high molecular weight, for instance, a blend of 10 to 50 percent 2,000 and 90 to 50 percent 1,000 molecular weight. A mol of these polyesters are reacted with 1.6 to 3.5 and preferably 2.0 to 3.0 moles of 4,4'-dicyclohexylmethane diisocyanate to form a prepolymer having about 2.8 to 10 and preferably 3.5 to 9.0 percent of free isocyanate. The prepolymer formation is accelerated and aided by heating the reactants, preferably at a temperature of 160° to 230° F. for about 1 to 3 hours.

The prepolymer formed is preferably dissolved in suitable solvents such as the liquid ketones and liquid aromatic hydrocarbons although other polyurethane solvents may be utilized. Then this prepolymer is reacted with preferably a ketone solution of 4,4'-dianilino-methane to form the polyesterurethane. Preferably the solvent solution of the prepolymer and the diamine are intimately mixed essentially at the time the resulting mixture is applied to the surface to obtain a shaped polyurethane when the reaction is completed.

The ethylenically unsaturated polymers or elastomers useful in this invention are the polymers of the conjugated diolefins of four to about 10 carbon atoms such as butadiene or isoprene alone or with the mono-olefins having from two to about 20 carbon atoms. Representative polymers are natural rubber and the synthetic rubbers, such as polybutadiene of high to low cis content, polyisoprene of high to low cis content, polybutadiene-isoprene, polybutadiene-styrene, polybutadiene-acrylonitrile and the terpolymers of ethylene and propylene with a third monomer to yield double bond cure sites in the polymer.

This invention can be illustrated as follows: a commercial cardboard blank for use in making fuel cell forms is bent along the score line and taped with a paper tape along the joints to seal the cardboard into a form for building a fuel cell for an airplane. It should be indicated that the commercial cardboard blanks for forming molds or building forms for airplane fuel cells contains a polyethylene or wax mold release agent on the surface thereof. Consequently, when the reaction mixture of the polyurethane prepolymer and the diamine is sprayed over the cardboard form and cured, it will permit the cardboard form to be removed to leave a finished fuel cell. Usually about 1 to 2 coats of the polyurethane reaction mixture is applied by spraying to build an inner layer up to the desired thickness, usually 10 to 20 mils. A suitable barrier layer is applied by spraying or brushing on a solution of nylon (in ethanol isopropanol solution) or polyvinylidene chloride or any of the other well-known barrier materials. Another coat of polyurethane reaction mixture is spray coated over the cardboard form to build up a polyurethane coating over the barrier coat when the barrier coat has dried sufficiently to be free or essentially free of solvent.

While the polyurethane reaction mixture coated on the cardboard form is still tacky, in some instances it is desirable to apply a nylon fabric or polyester fabric over the coating to reinforce the fuel cell. Then at least one or more coats of the polyurethane reaction mixture is applied over the fabric to give a cell having the desired strength.

Then a suitably compounded natural rubber sheet is laid up by hand over the polyurethane layers to incorporate a fuel sealing layer into the tank. Then at least one additional coat of polyurethane is applied over the natural rubber along with a fabric coat. The built-up cell was placed in a steam autoclave and cured 2 hours with 60 pounds per square inch of steam.

Where the polyurethane was of the conventional type, an inferior fuel cell was produced but when the polyurethane was of the type described heretofore and illustrated in the following Examples I, II, III and IV, the fuel cell had superior physical properties and was free of delamination.

The above-described method of building a fuel cell provides one in which the inner layer of polyurethane is continuous or seamless. Also, the layer of fuel sealing ethylenic unsaturated elastomer in the fuel cell is protected from poor workmanship experienced in the conventional hand layup of the rubber where poor seams are obtained that permit fuel to leak through to swell and destroy the fuel sealing layer and the tank.

In another embodiment a reaction mixture of polytetra-methylene adipate, 4,4'-dicyclohexyl methane diisocyanate and 4,4'-dianilino-methane is applied to a nylon or polyester fabric of 8½ to 12 ounces per square yard which has been spread flat on the floor to coat the fabric to the desired thickness. When the reaction mixture has reacted and cured the fabric may be turned over to expose the side that has previously rested on the floor. Then this newly exposed side is coated in a manner analogous to that above with the reaction mixture to give a fabric that is completely rubberized.

The exposed rubberized fabric then is coated by painting with a cement to build up a nonpolyurethane coating on the polyurethane. Sufficient paint coats are applied to give a coating or layers from 5 to 100 mils in thickness. Then the container having nonpolyurethane coating is cured with live steam for 1 to 2 hours at about 240° F.

EXAMPLE I

A prepolymer was prepared from 1 mol of polytetramethylene adipate of 1,000 molecular weight, 1 mol of polytetramethylene adipate of 2,000 molecular weight and 4 moles 4,4'-dicyclohexyl methane diisocyanate. It was diluted with toluene to 50 percent solids. Analysis showed an isocyanate content of 2.2 percent NCO. The prepolymer was extended with 4,4'-methylene-dianiline (MDA) dissolved in methylethyl ketone, and used to spray coat the cardboard form to form a fuel cell or to coat cloth to form a transport tank.

The amine level was varied from 0.8 to 1.0.

EXAMPLE II

The diluted prepolymer from Example I was mixed with a curative solution prepared from 20 parts 4,4'-methylene-dianiline and 80 parts acetone. Satisfactory containers were made at amine levels varying from 0.8 to 1.1 according to foregoing procedures.

EXAMPLE III

The prepolymer from Example I was diluted with 1/1 toluene/acetone mixture to give a solution of 50 percent solids. An MDA diamine curative solution was prepared from 20 parts 4,4-methylene-dianiline and 80 parts methylethyl ketone. A commercial black vinyl acrylic lacquer was added for color. A spray coat on glass of 20 mils was laid down and then a layer of an ethylenic unsaturated rubber was applied to give a composite of about ¼ inch in thickness. This composite was steam cured to give a laminate free of evidence of water degradation.

EXAMPLE IV

A prepolymer was prepared by reacting one mol tetramethylene azelate (1,000 molecular weight) and two mols 4,4'-dicyclohexyl methane diisocyanate. Toluene was used to dilute the prepolymer to 50 percent solids. This prepolymer had an isocyanate content (percent NCO) of 2.5 percent by weight. The diluted prepolymer and curative solution of 4,4'-methylene-dianiline in methylethyl-ketone was mixed at ratios shown in Table I. The sheets formed at these ratios and cured at room temperature had physicals shown in Table I below:

TABLE I

| Recipe No. | 1 | 2 |
|---|---|---|
| Diluted prepolymer | 50 | 50 |
| 4,4'-methylene dianiline | 2.4 | 2.7 |
| Methyl ethyl ketone | 8.0 | 8.0 |
| Black acrylic lacquer | – | 5.0 |
| Physical Properties | | |
| Tensile (psi) | 2200 | 2500 |
| Elongation (%) | 370 | 305 |
| After 14 days in water at 158° F. (measured wet) | | |
| Tensile (psi) | 4600 | 3400 |
| Elongation (%) | 380 | 330 |
| Thickness (inch) | 0.021 | 0.019 |

A satisfactory adhesive for adhering the seams of the fabric in construction of liquid containers or related elastomeric covered fabric articles is one made by reacting a polytetramethylene adipate of about 1,500 to 2,000 molecular weight with 4,4'-dicyclohexyl methane diisocyanate to form a prepolymer and then at a reactive ratio of 0.85 mixing 100 parts of the prepolymer with 7.12 parts of a mixture of 58.2 percent cumene diamine and 41.8 percent of m-phenylene diamine. Also, a mixture of a liquid MOCA (11–13 parts) and mercaptobenzothiazole (0.5 to 1.5 parts) on 100 of the prepolymer can be used as an adhesive when reacted with the above prepolymer. Liquid MOCA is the designation for a commercial grade of methylene diorthochloroaniline that is a liquid at room temperature.

In some instances the prepolymers of polytetramethylene adipate and 4,4'-dicyclohexyl methane diisocyanate with the aromatic diamines have Shore A hardness in excess of 85. In that event it is desirable to use the prepolymer of 4,4'-dicyclohexyl methane diisocyanate with the polyester of polyhexamethylene adipate or polyhexamethylene azelate to react with the aromatic diamine. The reaction product of these prepolymers with the aromatic diamines can be obtained in a range of Shore A hardnesses. Of the aromatic diamines, the phenylene diamines, the bis(aminophenylene) alkanes, the biphenylene diamines and the alkyl and the halide derivatives of these compounds, where the alkyl and the alkane have one to about 18 and preferably one to 12 carbon atoms and the halide is preferably chlorine, although the other halogens, iodine, bromine and fluorine are included, are the more desirable for achieving a cure. Representative members of the above classes of aromatic diamines useful for curing the prepolymers of this invention are orthophenylene diamine, paraphenylene diamine, metaphenylene diamine, metacumenediamine, chlorophenylene diamine, 4,4'-methylene dianiline, 3,3'-dimethyl-4,4'-diamino diphenyl-methane, 3,3'-dichloro-4,4'-diamino diphenylmethane, benzidine, tolidine and dichlorobenzidine.

Representative ethylenic unsaturated polymers or elastomers that can be used in this invention are those known as the sulfur curable rubbers. A typical recipe for use in building a self-sealing layer in the fuel tank or container of the preceding example is a 100 parts of natural rubber (smoke sheet), 1 part sulfur and 5 parts magnesium oxide. Another typical rubber recipe for use in this invention to form the ethylenic unsaturated polymer layer in the polyurethane laminate is:

| Ingredients | Parts |
| --- | --- |
| Copolymer (55 parts butadiene 45 parts acrylonitrile) | 100.00 |
| Zinc oxide | 5.00 |
| Magnesium carbonate | 1.00 |
| Sulfur | 2.00 |
| Carbon black | 80.00 |
| Stearic acid | 1.00 |
| Di-benzothiazyl disulfide | 1.60 |
| POlyvinyl chloride resin | 20.10 |
| Dioctyl phthalate | 4.15 |
| Tributyl citrate | 4.15 |
| Triglycol ester | 4.15 |
| Dibutyl phthalate | 5.00 |
| Total | 228.15 |

These compounded rubbers can be applied either as a sheet, or as a cement to the polyurethane layer or coat to form the laminate which is cured to give desired structure such as transport tank, a self-sealing fuel tank or other articles.

The cure of laminate can be achieved by use of steam of about 240° F. for a half to several hours depending on the type cure desired and the amount of sulfur and other curatives used. It is preferred that pressure of cure be at least about 30 pounds per square inch (psi) and preferably 60 to 100 psi. It should be noted where steam of 240° F. is used the pressure of 60 psi is developed by use of supplemental amounts of air or other gases at desired pressure.

It is especially preferred that the polyurethanes of this invention be compounded or contain sufficient epoxy compound or resin to give an excess epoxy or free epoxy groups. Normally, about 0.5 to 5 parts of the epoxy compound or resin per 100 parts of the polyurethane recipe is used.

The epoxy compounds are those formed by epoxylation of an ethylenic double bond of the lower polymers or fatty oils. A preferred member is the reaction product of bis phenol A with epoxychlorohydrin.

It is indeed unexpected to find a laminate of a polyurethane of an ethylenically unsaturated polymer, compounded with a suitable curative (0.1 to 10 parts) such as sulfur and sulfur-yielding ones or organic peroxides can be cured with line steam without appreciable degradation of the polyurethane.

While certain representative embodiments and details have been shown for the purpose of illustrating the invention, it will be apparent to those skilled in this art that various changes and modifications may be made therein without departing from the spirit or scope of the invention.

What is claimed is:

1. A fuel cell or tank resistant to steam treatment with steam at 60 pounds per square inch pressure for two hours, having a continuous polyurethane elastomeric inner layer covered on at least one side with the fuel sealing layer of ethylenic unsaturated elastomer, said polyurethane being the reaction product of a mol of a polyester selected from the class consisting of polytetramethylene adipate, polytetramethylene azelate, polyhexamethylene adipate and polyhexamethylene azelate, 1.6 to 3.5 mols of 4,4'-dicyclohexylmethane diisocyanate, and 0.75 to 1 mol of an aromatic diamine and said ethylenic unsaturated elastomer being selected from the class consisting of polybutadiene, polyisoprene, polybutadiene-isoprene, polybutadiene-styrene, polybutadiene-acrylonitrile and terpolymers of ethylene, propylene with a third monomer to yield a terpolymer having double cure sites.

2. The fuel cell of claim 1 wherein the polyurethane is formed from a reaction product containing 0.5 to 5 parts of an epoxy compound per hundred parts of polyurethane.

3. The fuel cell or tank of claim 1 where a barrier layer is positioned between the polyurethane inner layer and the fuel sealing layer.

4. The fuel cell of claim 1 wherein the fuel sealing layer is covered with a coating of polyurethane to enclose the fuel sealing layer in polyurethane.

5. The fuel cell of claim 3 wherein the fuel sealing layer is covered with a coating of polyurethane to enclose the fuel sealing layer in polyurethane.

* * * * *